May 11, 1971 J. J. ELCHISAK ET AL 3,578,445

XEROGRAPHIC PLATE FABRICATION

Original Filed Sept. 26, 1963 10 Sheets-Sheet 1

INVENTORS:
JOHN J. ELCHISAK
WILLIAM D. HOPE
EDWARD M. VAN WAGNER
BY Ronald Zibelli

ATTORNEYS

INVENTORS:
JOHN J. ELCHISAK
WILLIAM D. HOPE
EDWARD M. VAN WAGNER

BY *Ronald Zibelli*

ATTORNEYS

May 11, 1971  J. J. ELCHISAK ET AL  3,578,445
XEROGRAPHIC PLATE FABRICATION
Original Filed Sept. 26, 1963  10 Sheets-Sheet 4

INVENTORS
JOHN J. ELCHISAK
WILLIAM D. HOPE
EDWARD M. VAN WAGNER
BY Ronald Zibelli
ATTORNEYS INVENTORS
JOHN J. ELCHISAK
WILLIAM D. HOPE
EDWARD M. VAN WAGNER
BY *Ronald Zibelli*

ATTORNEYS

INVENTORS:
JOHN J. ELCHISAK
WILLIAM D. HOPE
EDWARD M. VAN WAGNER
BY Ronald Zibelli
ATTORNEYS

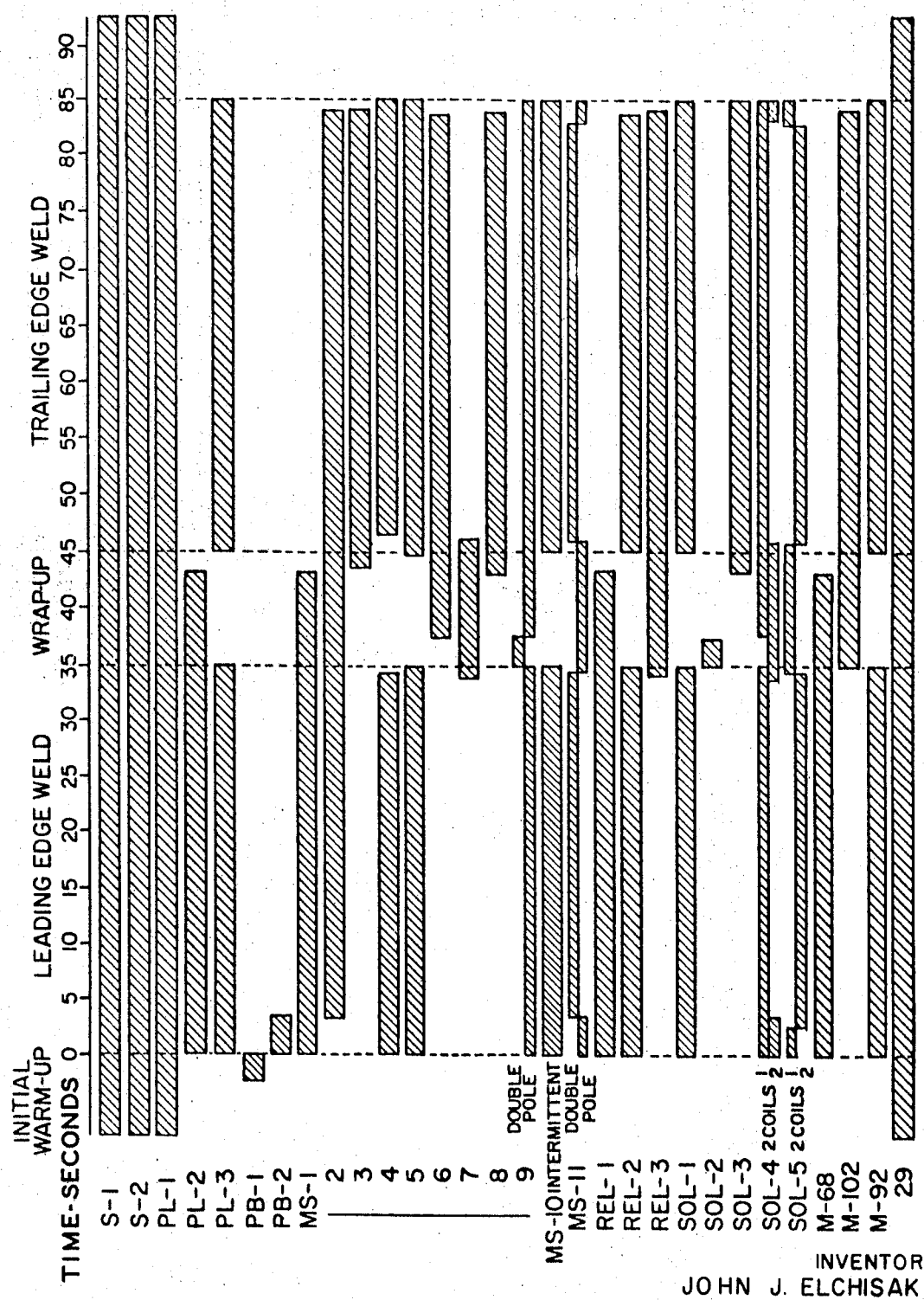

United States Patent Office 3,578,445
Patented May 11, 1971

3,578,445
XEROGRAPHIC PLATE FABRICATION
John J. Elchisak, Webster, William D. Hope, Rochester, and Edward M. Van Wagner, Webster, N.Y., assignors to Xerox Corporation, Rochester, N.Y.
Original application Sept. 26, 1963, Ser. No. 311,872, now Patent No. 3,341,681. Divided and this application June 22, 1967, Ser. No. 648,166
Int. Cl. G03g 5/04
U.S. Cl. 96—1.5    4 Claims

ABSTRACT OF THE DISCLOSURE

A xerographic drum and method for fabricating the same wherein a flexible, conductive, sheet-like substrate having a photoconductive surface thereon is bonded to the surface of a drum blank. A lateral fold is formed in the flexible substrate along one edge thereof which edge becomes the trailing edge when the substrate is placed on the drum blank. The leading or non-folded edge of the flexible substrate is bonded to the drum surface and as the drum blank is rotated, the flexible substrate is held taut to produce a tightly wrapped relationship therebetween. The trailing or folded edge is placed in overlapping relationship to the bonded leading edge and the trailing portion of the substrate bonded to the drum blank at a point preceding the fold. After bonding of the trailing portion of the substrate, the fold, as a result of the resiliency of materials, produces a tight, flexible seal which prevents developer material from accumulating between the drum blank and the substrate.

---

This is a division of application Ser. No. 311,872, filed Sept. 26, 1963, now U.S. Pat. No 3,341,681.

This invention relates to process and apparatus for the fabricating of xerographic plates and the product thereof.

In the process of xerography, for example, as disclosed in Carlson Pat. 2,297,691 issued Oct. 6, 1942, a xerographic plate comprising a layer of photoconductive insulating material on a conductive backing is given a uniform electric charge over its surface and is then exposed to the subject matter to be reproduced usually by conventional projection techniques. This exposure discharges the plate areas in accordance with the radiation intensity that reaches them, and thereby creates an electrostatic latent image on or in the photoconductive layer. Development of the latent image is effected with electrostatically charged, finely-divided material such as an electroscopic powder that is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

The xerographic plate exhibiting inherent photoconductive characteristics therefore forms one of the more if not the most essential element in carrying out the overall xerographic process. Photographic sensitivity, fidelity and the like ultimately produced are largely a function of the quality and characteristic properties of the particular plate. As commercially produced for carrying out the process continuously and automatically, the xerographic plate usually consists of a cylindrical drum or shell about 5 to 20 inches in diameter supporting on its periphery a photoconductive layer of a photoconductor such as vitreous selenium. As taught by Bixby in U.S. 2,970,906, procedures for applying vitreous selenium to a suitable substrate include conditions and apparatus of high vacuum.

While the method of Bixby produces the end product of desired quality, mass production, when applying vitreous selenium to drums, has been handicapped by the physical limitations imposed by the vacuum equipment. Thus, for a given equipment volume available for operability the number of drums that can simultaneously be coated in the vacuum chamber is largely a function of the individual drum bulk. Accordingly, for a given equipment size the mass production output of photoconductive coated drums has heretofore been limited by the number of units that can practically be placed within the vacuum equipment per cycle of operation. With a large capital investment in this type of production facility, a more efficient use thereof can result in a substantial saving per drum unit.

Now in accordance with the instant invention, there is provided a novel form of xerographic plate, produced by novel process and apparatus. The photoconductor, which may be selenium or any other photoconductor known in the art, is first formed on a conductive foil-like flexible substrate that is subsequently attached as by means of a percussive welding process tautly to a flat plate or to a drum blank with uniform firm adherence thereto. It has been found in accordance with the invention that the capacity of the vacuum equipment in terms of plate area on which vitreous selenium can be simultaneously deposited per cycle of operation as compared to previous methods is increased approximately 3 to 4 times as to substantially enhance the production output and decrease unit costs.

It is therefore an object of the invention to provide a novel method of forming a xerographic plate.

It is the further object of the invention to provide a novel xerographic plate useful in the xerographic art.

It is a further object of the invention to provide novel apparatus for attaching a photoconductive layer on a flexible substrate tautly about a drum blank to form a xerographic drum useful in an automatic xerographic apparatus.

It is a still further object of the invention to produce xerographic plates, particularly xerographic drums, more economically than heretofore.

The various features, advantages, and limitations of the invention will become more apparent from the following description and drawings, in which:

FIG. 19 is a timing chart for component operation in the welding apparatus.

Figure 1:
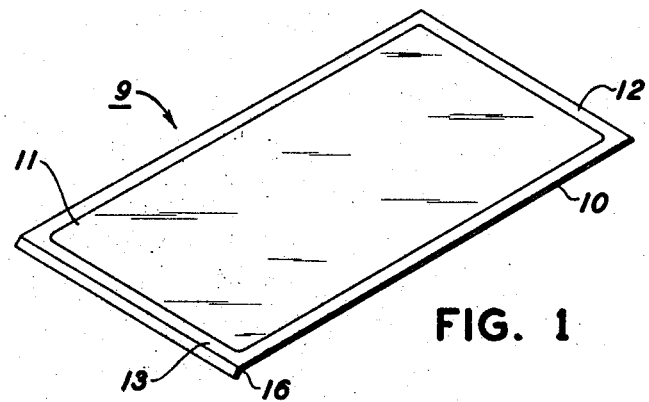
FIG. 1 is an isometric view of a photoconductive bearing flexible sheet of a type to be utilized in accordance with the invention.
Figure 1A:
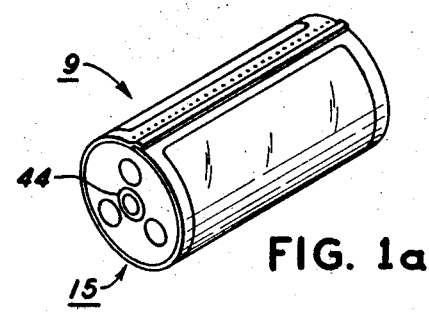
FIG. 1a is an isometric view of a xerographic drum formed on a drum blank with the sheet of FIG. 1.

Referring now to FIG. 1, there is illustrated a sheet designated 9 comprising a photoconductive layer 11 previously applied, as in the Bixby patent cited, on a foil member 10 dimensioned substantially to conform to a rigid support on which it is to be applied as a drum blank 15 shown in FIG. 1a. The foil may comprise any known material, such as brass or aluminum that is xerographically compatible with the photoconductor it is to support, while at the same time be of a material that is readily attachable to the ultimate support as by welding. Otherwise the foil should have a minimum thickness to provide strength for support and handling and a maximum thickness imposed as a function of the radius of wrap. Brass foil of 4-5 mils can be conveniently wrapped on a 2 to 3 inch radius. For purposes of the apparatus embodiment of welder to be described, foil 10 will be considered to be a commercial form of 4 mil brass to be attached to a steel drum. This however, is not intended to impose a limitation on the invention as other materials are substitutable as will be discussed below and as is known in the art.

The foil may be pretreated or cleaned as is known in the art, as for example disclosed in Stockdale copending application Ser. No. 118,626 filed June 21, 1961, now Pat. No. 3,234,020 and then subjected to masked deposition of the photoconductor 11 on the surface. According to the invention it is preferred that well-defined exposed borders of foil at least at the trailing and leading edges thereof be provided and designated 12 and 13 respectively through which a well can later be made. In the preferred arrangement the trailing border includes a lateral fold 16 of about 30° from the horizontal that after welding will produce a developer-tight spring-held overlapping joint in the manner shown in FIGS. 2b and 2c. The foil may be precut or trimmed to size prior to masking or may be post cut following simultaneous deposition of photoconductive material in spaced apart areas on an extended foil length.

The photoconductor 11 may comprise any of the various photoconductive insulating materials known to be useful in the art of xerography. Such materials preferably including vitreous layers such as selenium, sulfur, or anthracene and other organic photoconductors as well as dispersions of photoconductive pigments such as zinc oxide in various resins or other electrically insulating binder material. Layer 11 is generally characterized as being a good electrical insulator capable of maintaining a surface charge in the dark, but becoming substantially more conductive when illuminated by visible light, X-rays, or other forms of activating radiation. In the preferred embodiment, layer 11 is considered to be a layer of vitreous selenium on the order of about 20 to 100 microns in thickness and may be applied to the foil as by vacuum evaporation techniques. It should be appreciated at this point that vitreous selenium in its applied state is generally soft and easily abraded requiring delicate handling during subsequent plate manufacturing steps to avoid scratching or other damage that would reduce or destroy its usefulness. Also, because selenium has a somewhat taffy-like brittleness the radius of curvature about which it is to be wrapped in directly related to its thickness. For example, 50 micron selenium is limited to about a one-inch radius while 20 micron can be wrapped to ¼ inch. The other photoconductors are less brittle and therefore impose less of a problem in this regard.

Figure 2A:
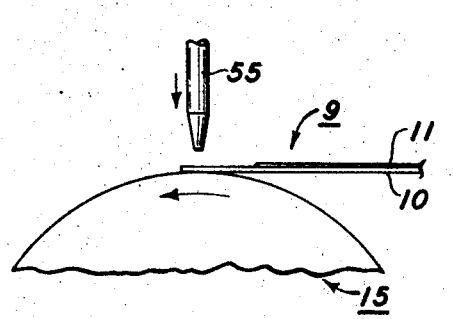
FIG. 2a is a fragmentary section of the relative physical relations in the step of attaching a leading edge of a sheet to a drum blank in accordance with the invention.
Figure 2B:
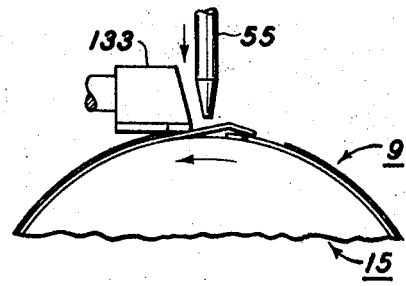
FIG. 2b is a similar relation as in FIG. 2a for attaching a trailing edge.
Figure 2C:
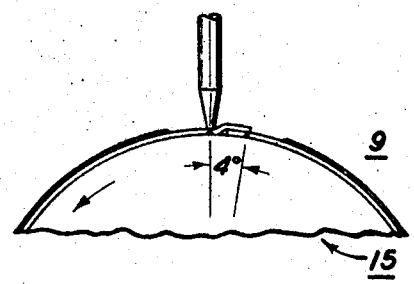
FIG. 2c illustrates the general physical configuration of FIG. 2b after welding.
Figure 2:
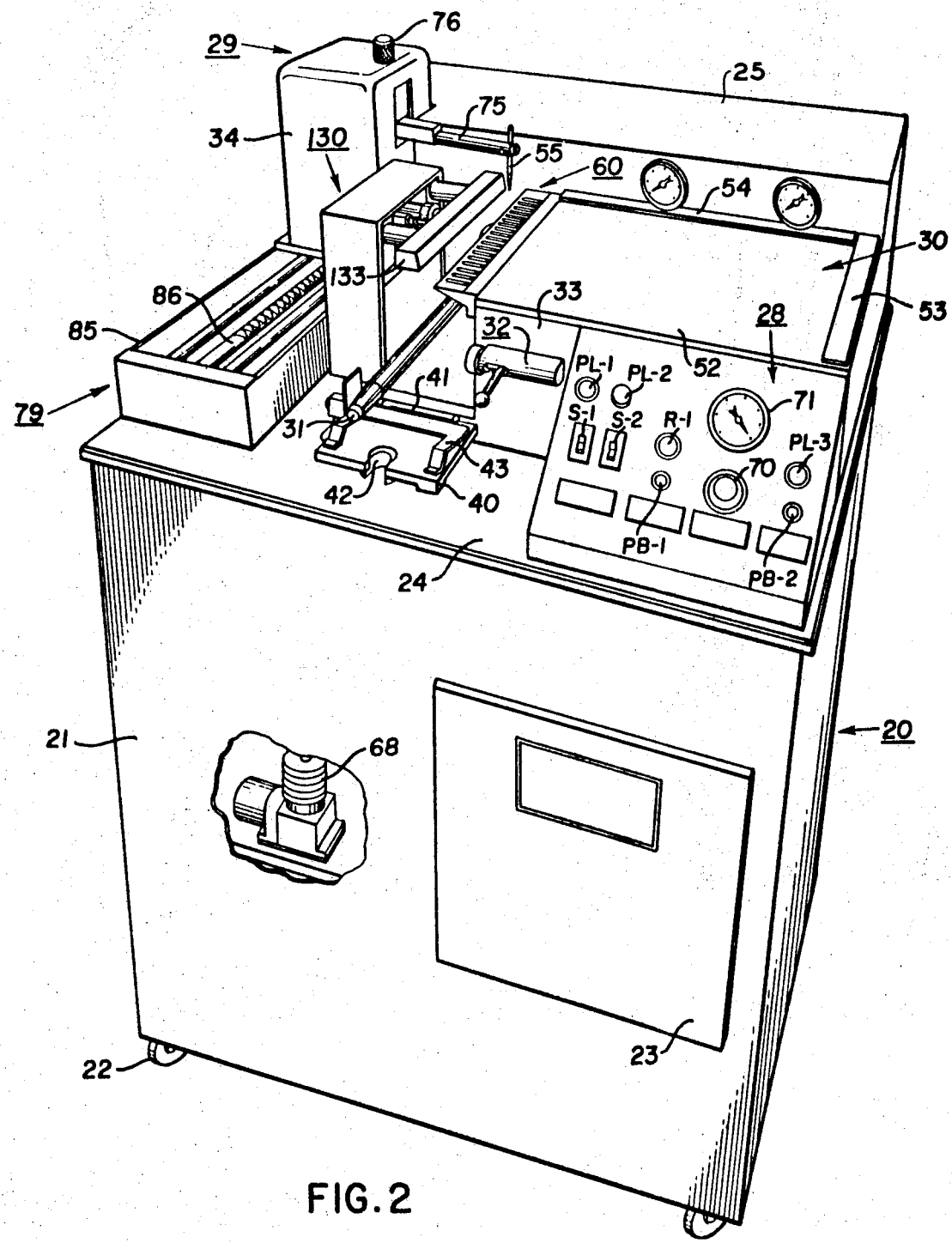
FIG. 2 is an exterior isometric view of a welding apparatus adapted for attaching the sheet of FIG. 1 to the drum blank.

Referring now particularly to FIG. 2 there is illustrated an exterior view of an apparatus designated 20 adapted to effect a neat spot weld attachment of the plate 9 to a drum blank 15. The apparatus includes cabinet sections 21 and 25 that enclose many of the working components and the former of which is mounted on casters 22 that permit portability in moving the apparatus about to a desirable location of operations.

Mounted on the front wall of cabinet 21 is a panel 23 supporting a power supply internally of the apparatus. On top of the cabinet is a shelf 24 supporting various operational units including generally a control panel 28, a welding unit 29, a plate support 30 and a rotatable mandrel 31 on which to support a drum blank 15 to which a plate on support 30 is to be attached.

To initiate use of the apparatus, a bolt latch 32 secured on a side wall 33 of the plate support is first withdrawn into unlatching position permitting a hinged gate 40 to be pivoted downward on its hinge 41 to the position shown in FIG. 2. As can be seen (see also FIG. 3) the gate includes a journal support 42 which with the gate when closed supports the mandrel 31 for rotation. Also provided on the inside face of the gate member is a ground electrode 43 connected to a ground cable 50 and which makes electrical contact with a side wall of a drum blank during the welding operation as will be described.

With the gate down, a suitable drum blank 15 is slipped via an axial drum sleeve 44 onto mandrel 31 until engaging a driving pin (not shown) on the mandrel. The gate is then closed and bolt 45 of latch 32 is drawn laterally via lever 46 until the flat face 47 of a cam 48 secured to the bolt end engages a striker plate 49 secured on the front face of the gate. Thereafter, lever 46 is pivoted downwardly causing cam 48 to force gate 40 to a tightly closed position relative to the drum blank.

A plate foil 9 on which a photoconductive layer 11 has been applied is then placed on platform 52 of support 30. About the platform are arranged rear and side guide members 53 and 54 respectively adapted to receive the right trailing corner of the foil member whereby to physically align the leading edge thereof into relation with the drum as shown in FIG. 2a. As can be seen, in this position the foil is supported in an approximately horizontal plane extending perpendicular to the drum axis with the leading edge of the foil overextending the line of peripheral drum tangency by approximately ⅟₁₆ inch. At the same time margin 12 is positioned below the lateral path to be described of the welding electrode 55.

With the drum blank and foil positioned with respect to each other as above, power is applied to the unit from the power supply by tripping toggle switches S1 and S2 on control panel 28. This energizes the welding unit 29 for warm up and places other components under control of individual switches as shown on FIG. 18.

In order to secure the underside of the foil tightly against the drum blank for the welding operation to follow, there is provided on the apparatus a vacuum lip designated 60 shown in FIGS. 2, 6, 7 and 8. The lip is mounted on the forward end of plate support 30 and when supplied with vacuum is adapted to draw the foil tightly downward thereagainst. Forming the lip is a laterally arranged casting 61 supporting a thin sectioned plate 62. Extending along the top surface of the casting there is defined a plurality of uniformly spaced transversely arranged grooves 63. Each of the grooves terminates rearward with an associated communicating passage 64 in turn connected to a common laterally arranged passage 65. At a central point connected to the passage 65 is an inlet 66 to which is attached a hose conduit 67 connected through a control valve 70 at its opposite end to the vacuum pump 68.

Operation of the vacuum pump is initiated by depressing push-button PB1, on the control panel 28, after which control valve 70 can be adjusted to effect the desired vacuum setting as indicated by gauge 71. Vacuum on the order of about 10 to 15 inches of mercury has been found suitable.

With the foil thus held, the leading border is then spot welded to the drum by means of the welding apparatus 29, that includes a welding head 34 of a type commercially available which in the preferred embodiment comprises a No. 1037 Weldmatic Welding Head, manufactured by the Weldmatic Division of Unitek Corporation. The welding head includes an arm 75 extending horizontally forward therefrom to support a welding electrode 55 positioned above the foil vertically aligned above the line of tangency between the foil and drum. The head includes a pneumatic actuator to effect a vertical reciprocating movement of arm 75 and electrode 55 and is timed to produce a spot-weld between the foil and drum on each occasion the electrode contacts the foil on its descent as the head is longitudinally advanced start-stop by means of a carriage 79. Adjustment knob 76 permits setting of the desired contact pressure of the electrode tip against the foil before firing the electrode. This setting is usually in the range of about 4–6 p.s.i.g.

Figure 4:
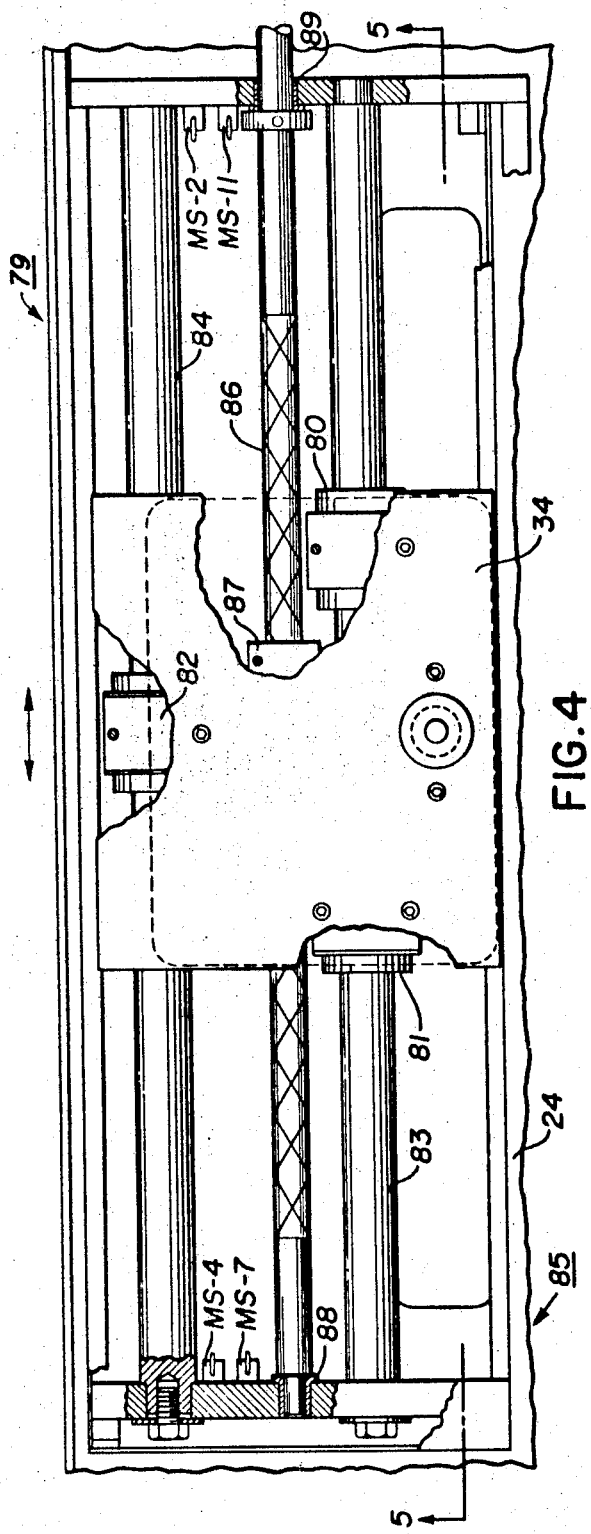
FIG. 4 is a plan view of the welding head carriage in the apparatus of FIG. 2.
Figure 5:
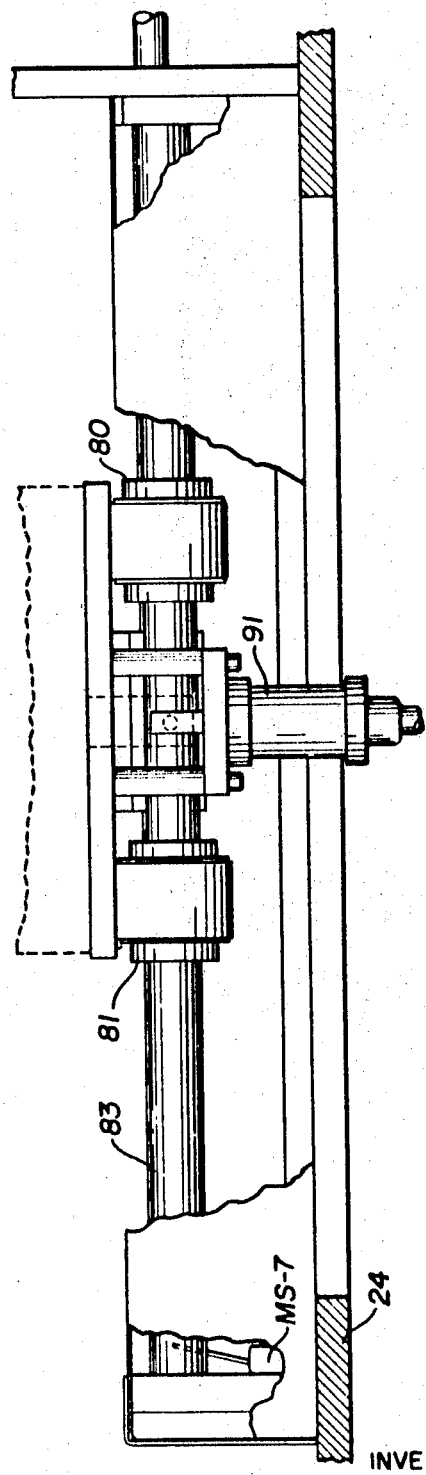
FIG. 5 is a sectional view taken substantially along lines 5—5 of FIG. 4.

Referring particularly to FIGS. 2, 4, and 5, it can be seen that the welding head 34 is supported on the carriage by means of three frictional-type bearings, 80, 81, and 82, secured on its underside. The carriage includes parallel stationary guide rods 83 and 84 on which the bearings are adapted to ride and secured in opposite end walls of a rectangular frame 85 mounted on shelf 24. Extending parallel and between the guide rods is a rotatable reversing lead screw 86 mounted for rotation in frame bearings 88 and 89. The lead screw internally engages a lead nut 87 secured underside of the head causing the head to be advanced in the appropriate direction when screw 86 is rotated. Also suspended below the head is an air cylinder 91 adapted when pulsed to draw the electrode from a normally up position as shown in FIG. 2 to a descended contact position for welding as shown in FIG. 2c.

Drive for the lead screw, as shown in FIGS. 6, and 9–12 originates from motor 92 energized by depressing push-button PB2 on control panel 28. The motor drive is transmitted via timing belt 93 to a sheave 94 secured on a rotatable shaft 95 that rotates at constant speed when motor 92 is operating. The output of shaft 95 is connected to a 4-stop Geneva mechanism 96 converting a constant drive input to a start-stop output in the ratio of 4 to 1 per revolution of the shaft. The output of the Geneva is conveyed by a rotatable shaft 97 on which spur gear 98 is secured and meshing with pinion 99 secured to an extension of lead screw 86. As motor 92 operates therefore, the welding head is caused by the carriage mechanism to move axially parallel to mandrel 31 in a start-stop cycle. Concomitantly therewith, cam 101 on the rear end of shaft 95 actuates a micro-switch MS–10 in timed relation to movement of the head to energize air solenoid SOL–1 when head movement stops actuating air cylinder 91 to effect the vertical descent and ascent of electrode 55. With each descending contact at the set firing pressure the electrode is energized to form a weld at the point of contact. In a preferred arrangement welds are made on about ¼ to ½ inch spacing until motor 92 is deenergized as the head reaches its end of travel and actuates micro-switches MS–4 and MS–7 supported on frame 85. In this latter position, welding of the leading portion of the foil to the drum 15 has been completed and the apparatus responds in readiness to the next operational sequence.

Figure 3:
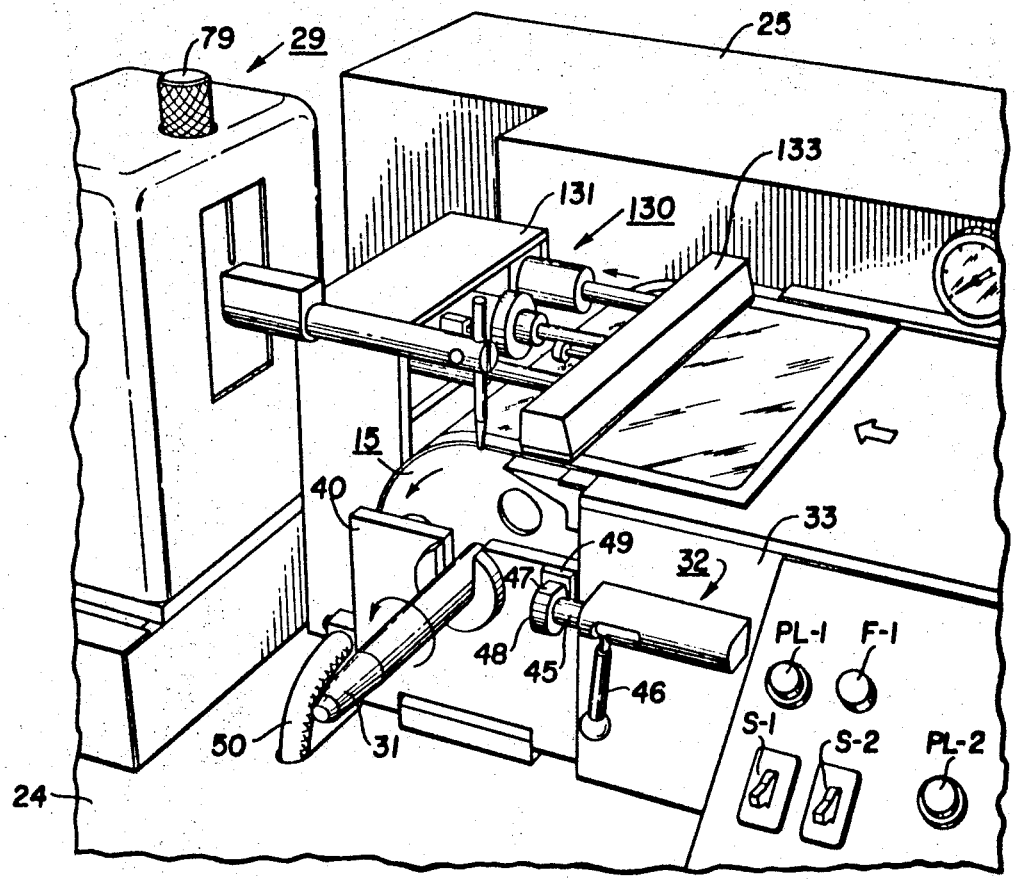
FIG. 3 is a isometric view of a portion of the apparatus of FIG. 2 during a subsequent wrap-around operational step.
Figure 6:
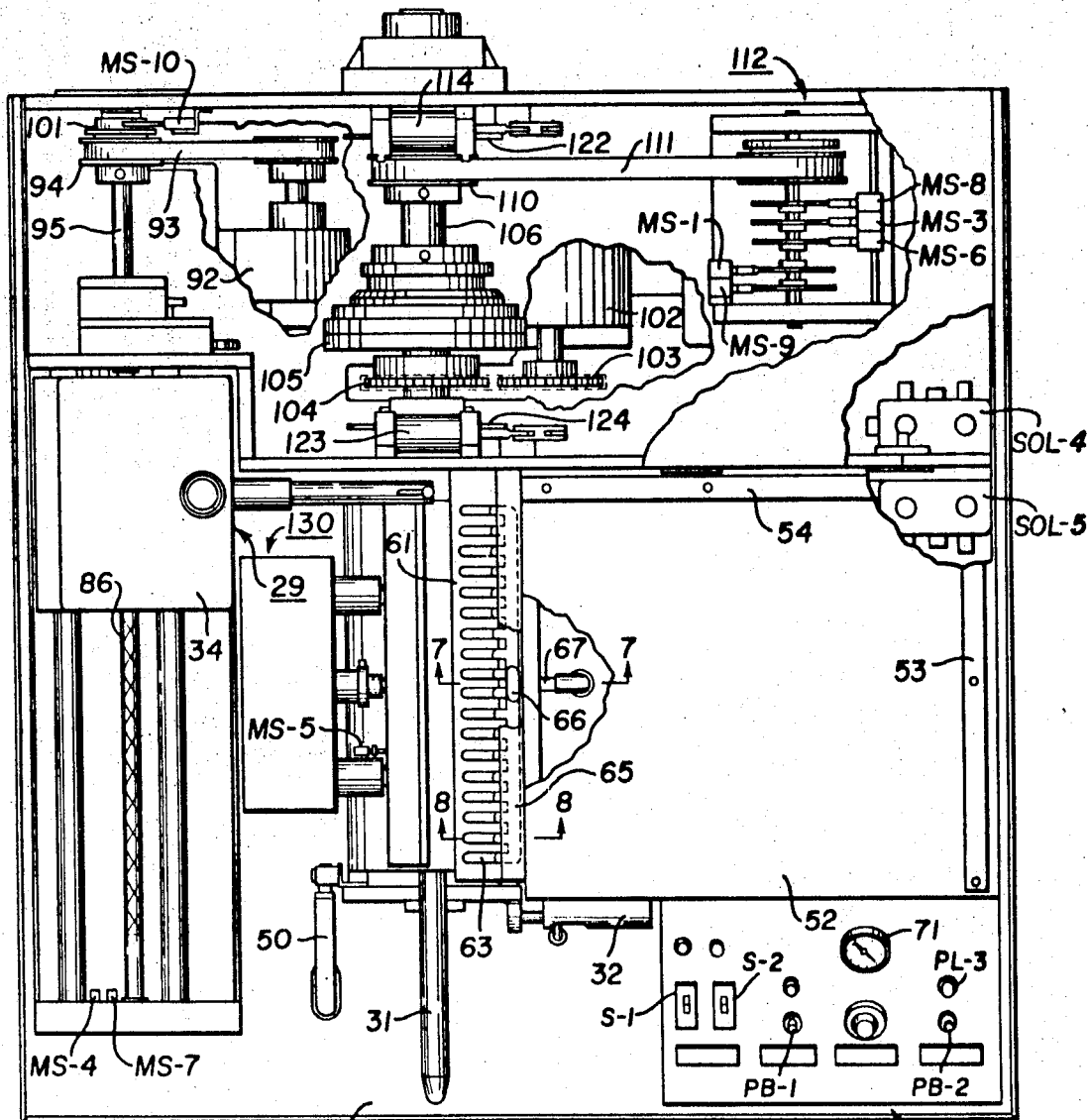
FIG. 6 is a top plan view of the apparatus of FIG. 2, partially broken away to illustrate the drive mechanisms thereof.
Figure 7:
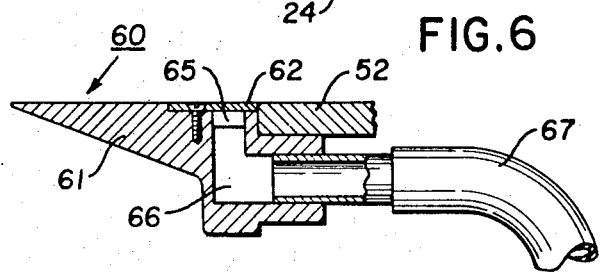
FIG. 7 is a sectional elevation taken substantially along lines 7—7 of FIG. 6.
Figure 8:
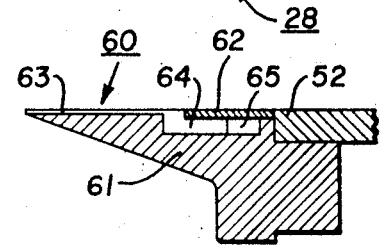
FIG. 8 is a sectional elevation taken substantially along the lines 8—8 of FIG. 6.
Figure 9:
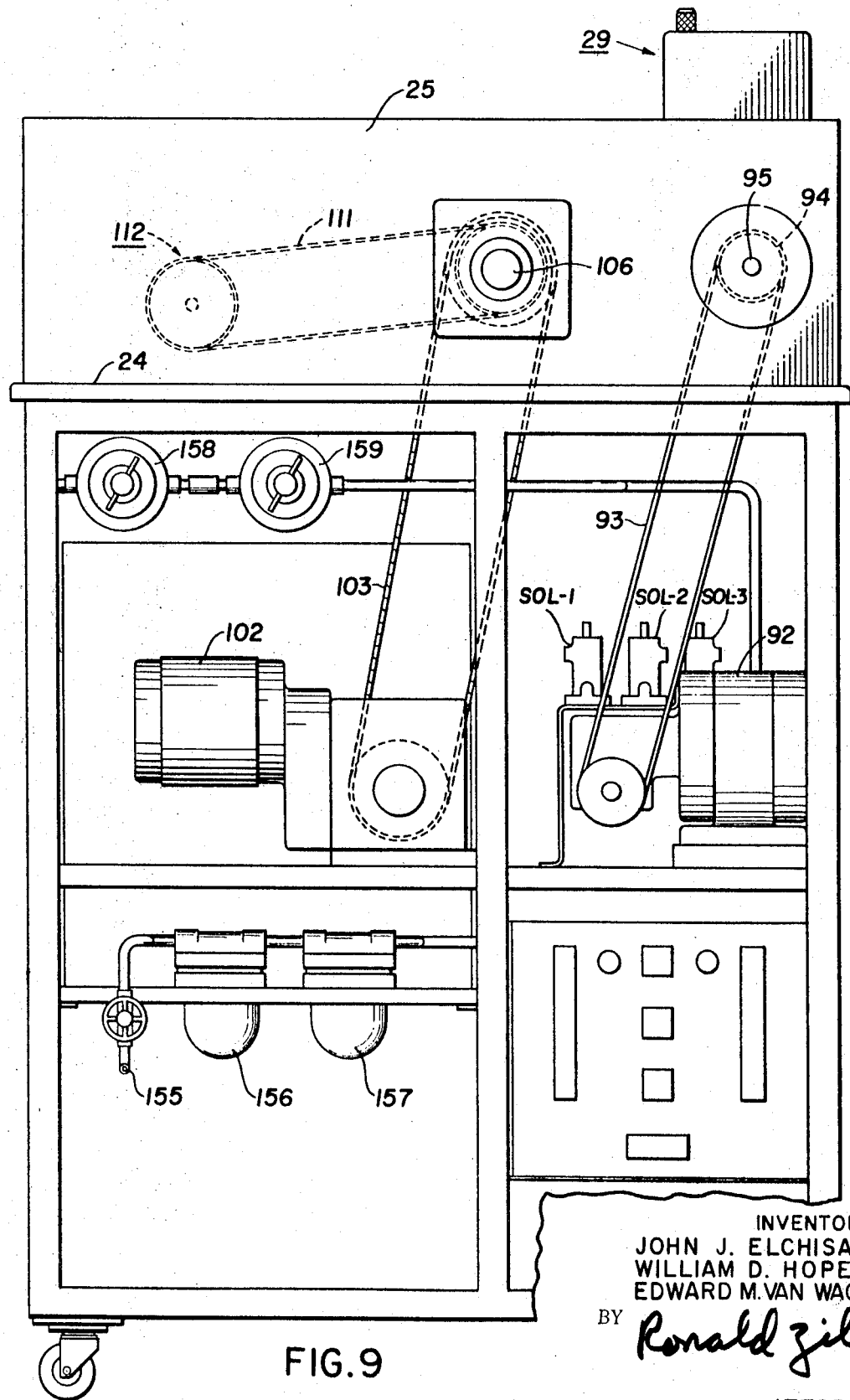
FIG. 9 is a rear elevation, of the apparatus of FIG. 2 with the cover removed.
Figure 10:
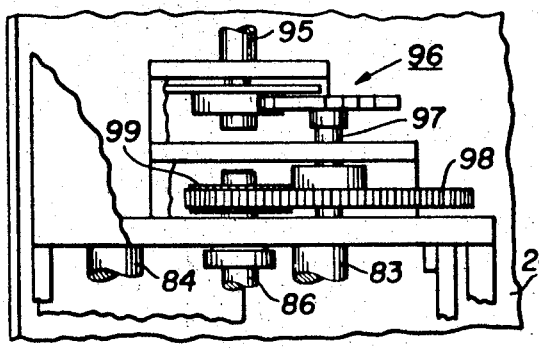
FIG. 10 is a partial plan view of the welder carriage drive.
Figure 11:
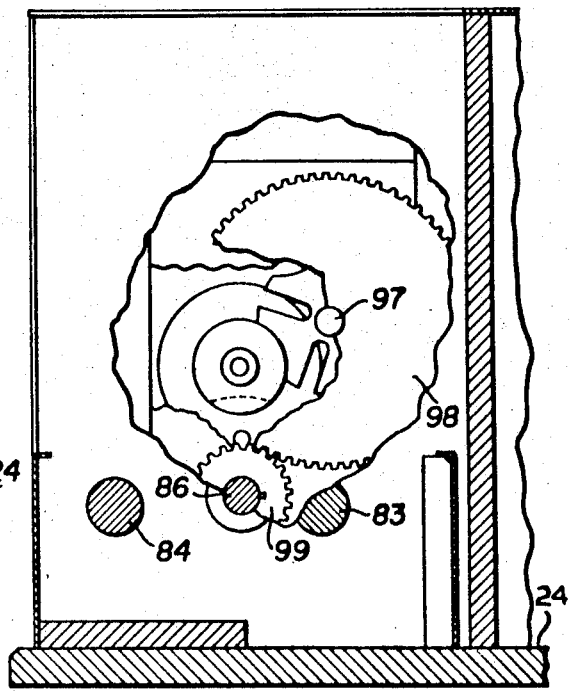
FIG. 11 is a front elevation partially broken away of the mechanism of FIG. 10.
Figure 12:
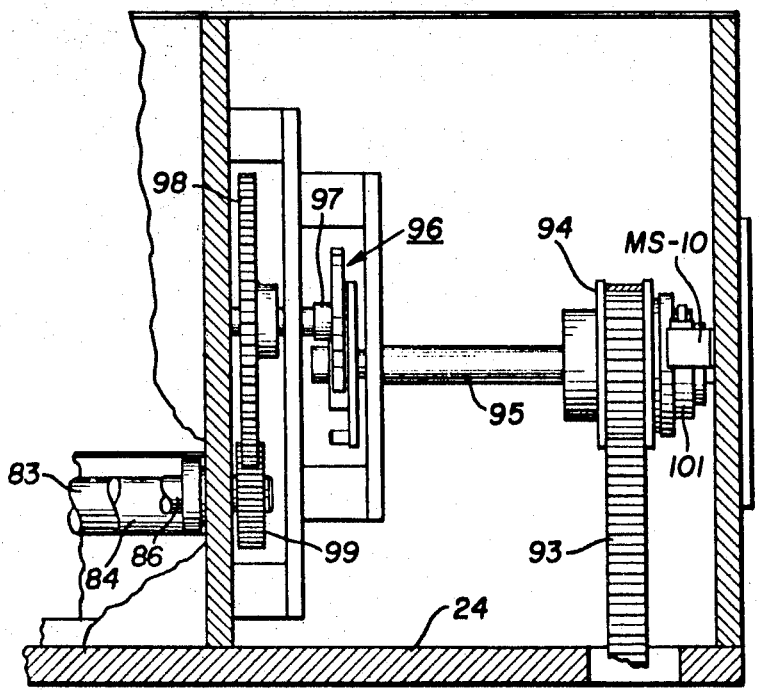
FIG. 12 is an end elevation of the mechanism of FIG. 10.
Figure 14:
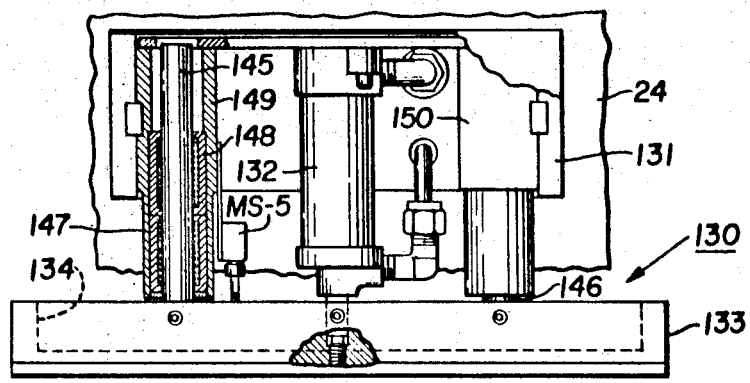
FIG. 14 is a plan view of a clamp mechanism shown in its normal non-clamping position for securing a trailing edge of a sheet in a welding position.
Figures 15, 16:
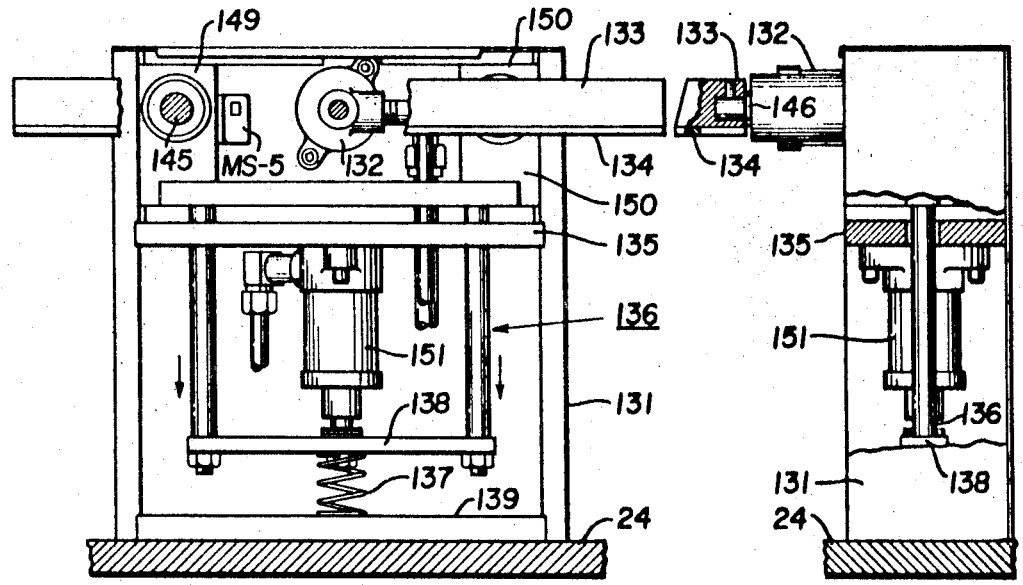
FIG. 15 is a front elevation of the clamp mechanism of FIG. 14.
FIG. 16 is an end elevation of the clamp mechanism of FIG. 14.
Figure 18:
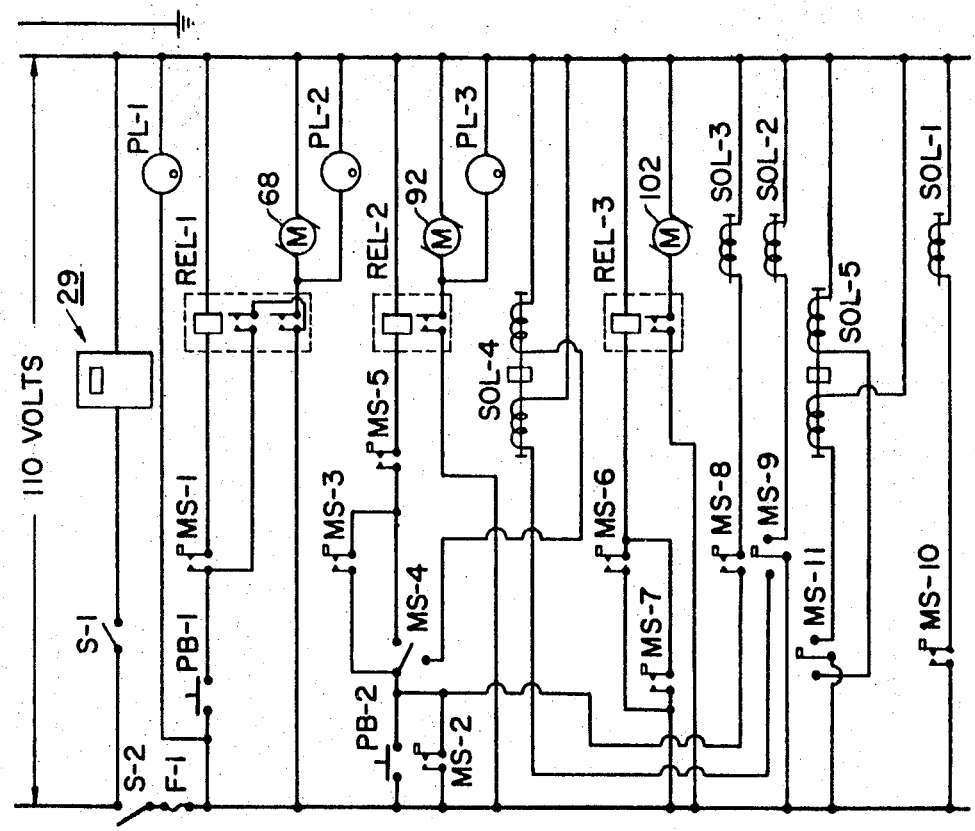
FIG. 18 is a schematic electrical diagram.

Foil 9 is then wrapped under a winding tension about the drum in the manner shown in FIG. 3 until the foil reaches a position relative to the electrode 55 as shown in FIG. 2b displaced 356° from the first weld position. This ensures effecting the second trailing edge weld in the non-overlapping portions of foil. Windup as shown in FIGS. 6 and 9 is effected from a constantly-driven motor 102 energized by micro-switch MS–7 actuated by the welding head in its traveled position. The drive output of the motor is transmitted via a timing chain 103 to a sprocket 104 in turn connected to the input of a slip clutch 105. When engaged, the clutch is adapted to drive a windup shaft 106 (see also in FIG. 13) that is coupled to the mandrel 31 on which the drum blank is secured and driven. Secured on the windup shaft on the side opposite the clutch is a sheave 110 driving a timing belt 111 adapted to effect operation of a programmer 112 to actuate microswitches MS–1, –3, –6, –8 and –9 and air solenoids in their related sequence of operation as shown in FIGS. 18 and 19.

When the foil wraps through a displaced 356° angle of rotation to the relation shown in FIG. 2b micro-switch MS–9 is actuated energizing air solenoid SOL–4 to admit air presure to air cylinder 114. Connected to the air cylinder is an arm member 115 (FIG. 13) supported to pivot about a pin 116 whereby the arm is moved when the cylinder is energized from the position shown dashed to the position shown solid. Secured extending from the arm 115 is a stop bar 120, adapted in the position shown in the figure to engage a stop plate 121 mounted on a cam stop 122 in turn secured to the windup shaft 106. This position of stop bar 120 arrests rotation of the shaft 106 at the appropriate welding position while continuous operation of motor 102 secures the shaft through action of the slip clutch urging the windup shaft in the direction arrested by the stopbar. As the drum rotates for foil wrap-up, vacuum is maintained in lip 60 to create a winding tension and effect a taut wraparound of the foil to the drum. Tensive, taut wrap has been found preferred to prevent subsequent rippling or the like of the foil on the drum when employed ultimately in an automatic xerographic apparatus.

In order to maintain this tension on the foil after the trailing edge breaks vacuum on passing over the vacuum lip there is provided an air clamp unit designated 130. The air clamp as shown in FIGS. 2, 3, 14, 15 and 16 includes a vertically arranged frame support 131 supporting internally near its top an air piston 132 connected to an elongated clamping head 133. Along the underside front perimeter of the head 133 there is provided a rubber shoe 134. The normal inactive position of the head is illustrated in FIG. 2 with the head retracted inward and supported at an elevation slightly above the plane of the foil. Within the frame 131 and extending laterally across is a stationary bar 135 through which is vertically extended a yoke 136 adapted to be moved up and down through sleeves provided in the bar. The head 133 is secured to the yoke and is maintained in its uppermost normal position by action of an auxiliary spring 137 compressed between a lower cross bar 138 of the yoke and a permanent plate 139 secured to shelf 24. The clamp head is further supported on individual guide rods 145 and 146 each horizontally movable in a pair of roller bushings 147 and 148, set respectively in blocks 149 and 150 mounted on the yoke.

The foil advances in the wrapping operation as in FIG. 3 with the trailing edge approaching vacuum lip 60. Before passing the lip air piston 132 is actuated through air solenoid COL-2 extending clamp head 133 horizontally outward beyond the weld line to the position shown in FIG. 3. On reaching its furthermost extension, air piston 132 is de-actuated while air piston 151 secured vertically below plate 135 is actuated through solenoid SOL-3 forcing the entire yoke support via cross bar 138 down against the compression of spring 137. This latter action brings the head shoe 134 down on the foil surface applying a pressure thereagainst of approximately 20 to 30 p.s.i.g.

Continued advancement of the foil with the clamping head in this position causes the latter to be dragged rearwardly until restored to its normal unextended position behind the path of electrode 55, but still applying a mechanical pressure downward against the foil on the drum. By this means, a constant windup tension is maintained between the foil and drum blank to effect a taut wrap about the entire drum circumference while serving during the subsequent welding operation of the trailing border to hold the foil firmly against the drum as in FIG. 2b. Micho-switch MS-5 provides a safety interlock to prevent subsequent operation of the welding head unless the clamping head is fully retracted.

Figure 13:
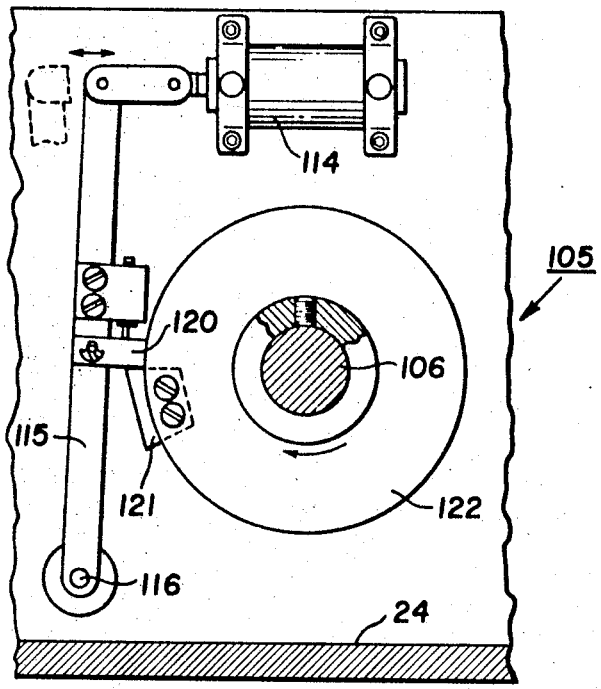
FIG. 13 is an elevation of a clutch stop mechanism associated with the wrap-around drive for wrapping a sheet into a drum blank after welding a leading sheet edge thereto.

Thereafter, the welding operation described above is repeated with the welding electrode being advanced continually start-stop in a return direction from that employed in welding the leading border of the foil. With each interruption of head movement electrode 55 effects a weld. When the welding head arrives at its furthermost position in completing the latter weld, micro-switch MS-2 is opened de-energizing the apparatus including air cylinder 151 permitting the air clamp to rise up and be restored vertically to its normal starting position. MS-2 also de-energizes solenoid SOL-4 causing air cylinder 114 to vent and release stop bar 120 (FIG. 13). This allows windup shaft 106 to rotate an additional 4° where it is positively stopped by the energizing of solenoid SOL-5 which actuates air cylinder 123 to arrest a cam plate 124 operative similar to cam plate 122 described above. Micro-switches MS-13, 6 and 8 are actuated during the final 4° of rotation and resume their original starting positions. The operation at this point is complete and fold 16 forms a tight compressive overlap onto border 12. By opening latch 32, gate 40 can be dropped and a completed xerographic drum removed.

Figure 17:
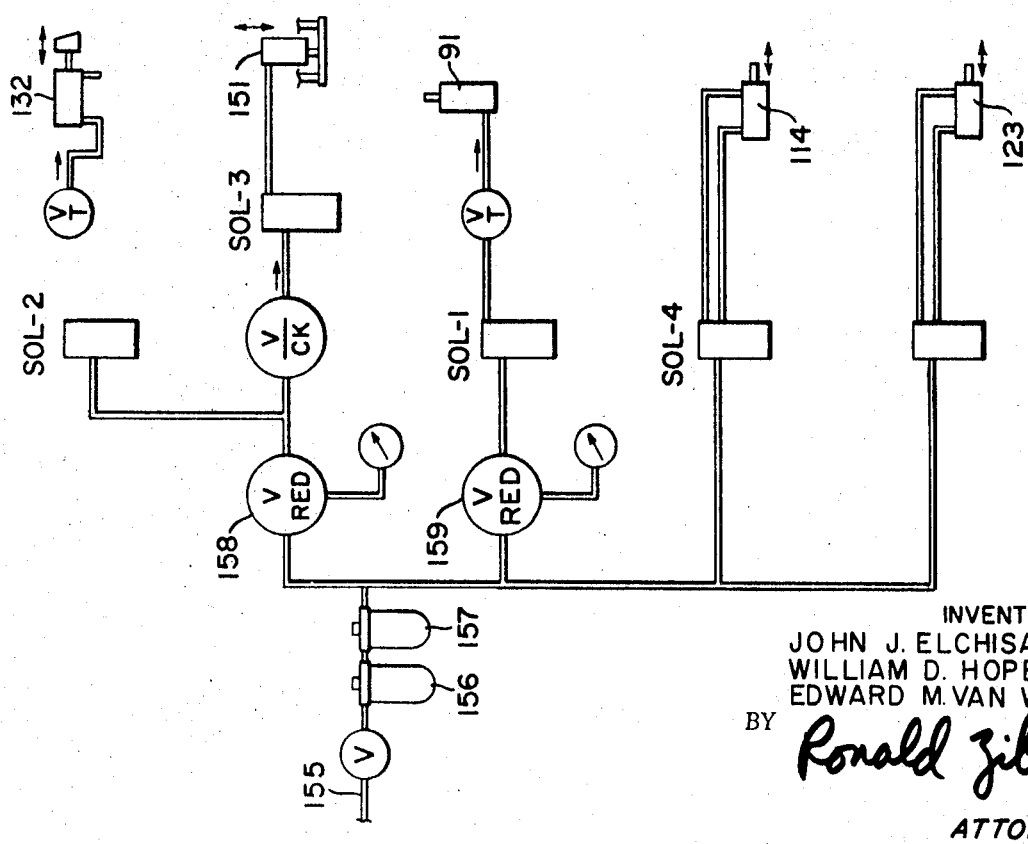
FIG. 17 is a schematic of the pneumatic connections and components for the welding apparatus.

Air pressure for the various operations is provided in the embodiment described from an external source supplied to a conduit 155 as shown in FIG. 9 and from which it passes through an air filter 156 and an oiler 157. As can be seen by referring also to FIG. 17, air pressure of about 60 p.s.i.g. is applied to solenoids SOL-4 and SOL-5 while the remaining filtered air is divided between pressure regulator 158 and 159 which reduces the pressure to approximately 21 p.s.i.g. and 30 p.s.i.g. respectively, for discharge to their pneumatically operated components in the sequence discussed above.

The apparatus above described had been found to produce a very neat and uniform attachment of the foil to the drum blank without abrading or otherwise deleteriously affecting the relatively soft photoconductive selenium surface. The use of this apparatus is obviously limited to those materials which can be joined by means of resistance capacitor discharge welding. Typical for such use are a steel drum blank and brass foil on which a photoconductor is supported. However, other materials are known in the art which are also susceptible to welding by this technique. Likewise, other materials not readily susceptible to such welding can be adapted, as for example by zinc and copper plating of an aluminum drum to which a brass foil can be subsequently attached. Further, it is possible to employ a transition strip between the foil and the drum to accomplish a satisfactory metallurgical combination between the foil and the transition strip and the transition strip to the drum. Other variations will occur to those skilled in the art. Further, it should be apparent that the welding apparatus has utility for attaching foils other than those supporting a photoconductor to a suitable drum blank for a variety of different purposes outside the xerographic art.

Since many changes can be made in the above construction and many apparently widely different embodiments of this invention can be made without departing from the scope thereof, it is intended that all matter contained in the drawings and specification shall be interpreted as illustrative and not in a limiting sense.

What is claimed is:

1. A method of forming an endless xerographic plate comprising:
   applying a photoconductive surface to a flexible conductive sheet-like substrate,
   bonding a first end portion of said substrate to a support member,
   forming a lateral fold in a second end portion opposite said first end portion,
   placing said second end portion in overlapping relationship to said first end portion, and
   bonding said second end portion to said support member at a point preceding said lateral fold.

2. A method of forming a xerographic drum of the type wherein a flexible, sheet-like substrate having a photoconductive surface thereon is mounted about the surface of a cylindrical drum blank comprising:
   forming a resilient fold at a first end portion of the substrate,
   connecting the other end portion of the substrate to the surface of the drum blank, and
   connecting the other of the end portions of the substrate to the surface of the drum blank at a point preceding said fold in an overlapping relationship to the first connected end portion in opposition to the resilient fold.

3. A xerographic drum comprising:
   a generally cylindrical rotatable support member,
   a normally flat, flexible, sheet-like substrate having a photoconductive surface thereon, said substrate including leading and trailing edge portions, said trailing edge portion including a lateral fold therein extending across the substrate,
   means connecting said leading edge portion to said support member, and
   means connecting said trailing edge portion at a point preceding said fold to said support member with the substrate in surrounding relationship to said support member, said fold in said trailing edge portion being in an overlapping deflected relationship to said leading edge portion whereby to produce a flexible seal therebetween.

4. A xerographic drum of the type wherein a flexible, sheet-like substrate having a photoconductive surface thereon is mounted about the surface of a cylindrical drum blank including:
   a resilient fold formed a first end portion of said substrate,
   means connecting the other end portion of said substrate to the surface of the drum blank, and
   means connecting first said end portion at a point preceding said fold to the surface of the drum blank, said second connected end portion being in overlapping relationship to said first connected end portion and biased toward said drum blank in opposition to said resilient fold.

References Cited

UNITED STATES PATENTS

| | | | |
|---|---|---|---|
| 755,436 | 3/1904 | Bentet | 29—477.7 |
| 1,942,304 | 1/1934 | Mylting | 29—148 |
| 2,787,827 | 4/1957 | Karmazin | 29—477.7 |
| 3,190,199 | 6/1965 | Clark | 95—1.7 |

FOREIGN PATENTS 899,333 12/1953 Germany.

GEORGE F. LESMES, Primary Examiner

J. C. COOPER III, Assistant Examiner

U.S. Cl. X.R.

355—16; 219—78, 107; 29—477.7, 478

PO-1050
(5/69)

UNITED STATES PATENT OFFICE
CERTIFICATE OF CORRECTION

Patent No. 3,578,445        Dated May 11, 1971

Inventor(s) John J. Elchisak et al

It is certified that error appears in the above-identified patent and that said Letters Patent are hereby corrected as shown below:

Claim 4, column 8, line 72, the phrase "first said end portion" should read --said first end portion--.

Signed and sealed this 24th day of August 1971.

(SEAL)
Attest:

EDWARD M. FLETCHER, JR.        WILLIAM E. SCHUYLER, JR.
Attesting Officer                 Commissioner of Patents